Jan. 30, 1934. R. STEENECK 1,945,470
SIGNAL TRANSMITTING APPARATUS
Filed Dec. 14, 1929  2 Sheets-Sheet 2

Inventor
Robert Steeneck
By his Attorney
Eugene C. Brown

Patented Jan. 30, 1934

1,945,470

UNITED STATES PATENT OFFICE 1,945,470

SIGNAL TRANSMITTING APPARATUS

Robert Steeneck, New York, N. Y., assignor to The Western Union Telegraph Company, New York, N. Y., a corporation of New York Application December 14, 1929
Serial No. 414,105

11 Claims. (Cl. 177—380)

This invention relates to an electric signaling system and more particularly to a signaling apparatus for transmitting distinctive current variations or signal impulses representative of certain information concerning a large number of definite items whereby such information may be visibly displayed or posted at a plurality of stations over a relatively small number of line wires, from a common transmitting station.

The invention is especially applicable to the transmission of vary quotations or prices of a multitude of different items such as stocks, bonds or commodities from some central point, such as a stock exchange, to numerous broker's offices, banks and similar places where it is desired to post the quotations automatically on indicator boards. The invention will be described with special reference to such a stock quotation system but it is to be understood that it is not limited to such a system.

In a copending application of R. Hoover, Serial No. 406,357, filed November 11, 1929, entitled Selecting and indicating system and in my copending application Serial No. 406,654, filed November 11, 1929, and entitled Stock selecting and indicating system, both assigned to the Western Union Telegraph Company, electrical indicating systems are described which are particularly adapted for the operation of a stock quotation or bulletin board in response to transmitted signals, to automatically select a stock and a particular range thereof, such as the "yesterday's close", "open", "high", "low" or "last" quotation and to operate a series of indicators for posting a desired price or quotation of such selected stock.

The numerical value of the quotation may involve four digits, namely, the hundreds, tens, units and fractional values thereof and in the system disclosed in said application, provision is made at the quotation board for five sets of indicators for each stock for posting the "yesterday's close", "open", "high", "low" and "last" quotations, each set including four indicator units for indicating the hundreds, tens, units and fractional values of the stock.

The receiving apparatus in response to the transmitted signals selects the stock to be posted, selects the range thereof and operates the indicator units of the particular range and stock selected. In order to take care of the rate at which sales are made at the stock exchange and to control the receiving apparatus over a relatively small number of line wires it is necessary that the signals be transmitted very rapidly and accurately. For instance, taking into account the reasonable future requirements, the signals must be transmitted at a rate of from 30 to 60 quotations per minute and the signals transmitted must be of such complex nature as to select one or more of at least five sets of indicators for any one of a thousand or more different stocks and to operate at least four indicator units for each set selected.

The type of signals employed for operating the receiving apparatus of the aforesaid application comprises three main groups of interspaced positive and negative impulses, the first group controlling the selection of the range and stock and being termed the "selecting" group, the second group serving to restore the selected indicators to normal or blank position and being termed the "restoration" group and the third group controlling the answer or quotation and being termed the "answer" group. Four transmitting channels are employed for the transmission of the signals of each group, such channels comprising either four separate line wires or two line wires having battery of positive and negative polarity applied to each line in conjunction with polarized relays at the receiving station for responding to the direction of current transmitted over each of the lines.

During the selecting operation, four control channels are employed for choosing concurrently the range and stock. For this purpose, each group of indicators comprising the range, i. e., "yesterday's close", "open", "high", "low" and "last" and combinations thereof are designated by single digit numbers, the "last" quotation for instance, being designated (1) "low" and "last" (2) "high" and "last" (3) "low" (4) "high" (5) "open" (6) "high" and "open" (7) and "yesterday's close" (8). Similarly each stock is arbitrarily designated by a three digit number, the stock having the greatest volume of sales and hence those most often quoted being designated by digits of low order, as 111, 121, etc.

The range is selected by transmitting over channel one a number of impulses corresponding to the digit number of the range to be posted and the stock is selected by sending over channels two, three and four, impulses corresponding in number to the hundreds, tens and units digits respectively of the arbitrary stock designating number. The receiving apparatus in response to such impulses selects the stock and range and subsequently operates to transfer the four control channels from the selecting mechanism to the four indicator units of the range and stock selected. Each indicator unit may then be operated by transmitting the required number of impulses over the channel connected thereto.

In order to eliminate accumulative errors each indicator selected is restored to its normal or blank position by transmitting ten restoration impulses over each of the four transmitting channels, channel one serving to restore the hundreds indicators and channels two, three and four the tens, units and fractions indicators respectively of the set or sets of indicators previously selected.

At the conclusion of the transmission of the restoration signals, the answer signals are transmitted over each of the four channels, in the form of positive and negative impulses corresponding in number to the hundreds, tens, units and fractions digits of the quotation.

In the receiving system described in the aforesaid Hoover application, equal intervals of time are allotted for the transmission of each group of stock selecting, restoring and answer signals. Thus, provision is made for a maximum of ten impulses for each group of signals over each channel and the signals of a succeeding group cannot be transmitted until the total time required for transmitting the ten proceeding impulses has elapsed, regardless of whether the entire ten impulses are employed or not. This receiving system depending upon uniform signal periods has certain advantages, particularly in the simplification of the selecting apparatus and in a copending application Serial No. 414,104, filed December 14, 1929, I have described a system for transmitting such signals of uniform periods for the operation of a system of the type described in said Hoover application.

In the receiving system described in my application, Serial No. 406,654, and in a similar system described in the patent to Hazelton 1,890,878, dated Dec. 13, 1932, however, the apparatus responds to signals in which the impulses of one group succeed those of the preceding group in predetermined time relation so that no unnecessary time is lost between the completion of the transmission of the selecting group and the commencement of the transmission of the restoration group, or between the completion of the transmission of the answer group and the commencement of the succeeding selecting group.

One of the objects of the present invention is, therefore, to provide a device for the transmission of a plurality of groups of signals of varying numbers of impulses for the operation of automatic stock quotation boards, in which the signals of each group succeeds those of the preceding group in definite time relation.

Another object is to provide a signal transmitting device which is simple, dependable and capable of rapid operation.

A further object is to produce a signal transmitting system embodying a rotary transmitter whereby a plurality of groups of signals of varying numbers of impulses may be transmitted over each of a number of channels, in which the impulses of one group will succeed those of the preceding group in definite time relation irrespective of the number of signals comprising said preceding group.

Other objects and advantages will clearly appear from the following description taken in connection with the accompanying drawings and appended claims.

In accordance with my invention I employ four rotary transmitters, each having separate brushes and a start-stop mechanism for each brush. Two of the transmitters control the transmission of signals over two of the control channels and the remaining two transmitters control the transmission of signals for the remaining two control channels. The distributors associated with the first two control channels provide, one for the transmission of the selecting signals for both channels and the other for the transmission of the restoration and answer signals for both channels.

The selecting and indicator operating signals for all four channels are set up through a keyboard arrangement or equivalent device and thereafter the brushes of the distributors controlling the selecting signals are released to transmit such selecting signals. Immediately following the transmission of the last selecting signal, irrespective of the number of impulses comprising such signals, the brushes of the transmitters controlling the restoration and answer signals are released, thereby starting the transmission of these latter groups of signals.

Similarly after the last signal of the answer group has been transmitted means is provided for placing the system into condition for the immediate transmission of the succeeding group of selecting signals.

In order that the invention will be more fully understood reference will be had to the accompanying drawings in which.

Figure 1:
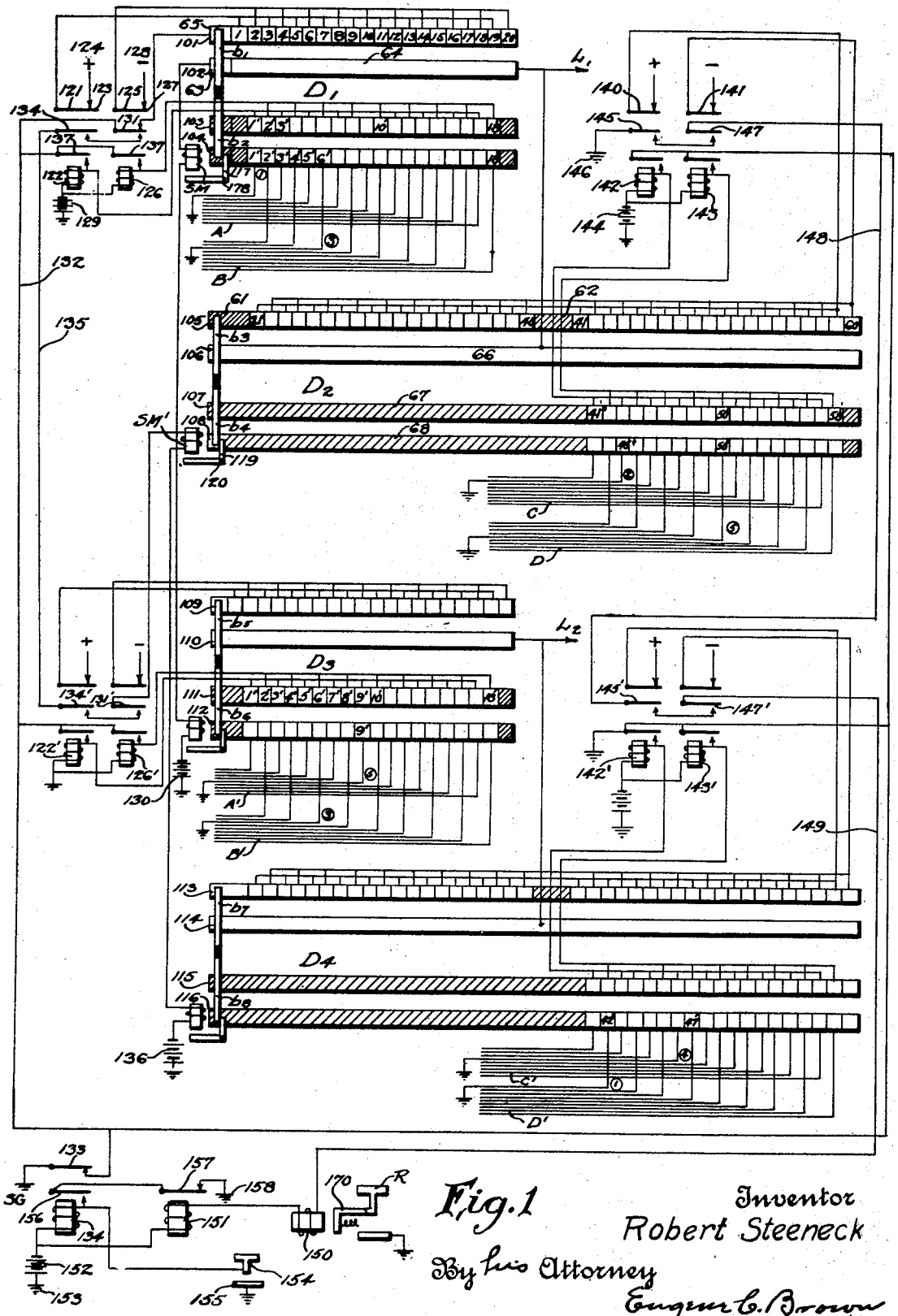
Figure 1 is a schematic diagram of a rotary transmitter and associated circuit arrangement of one embodiment of my invention.
Figure 2:
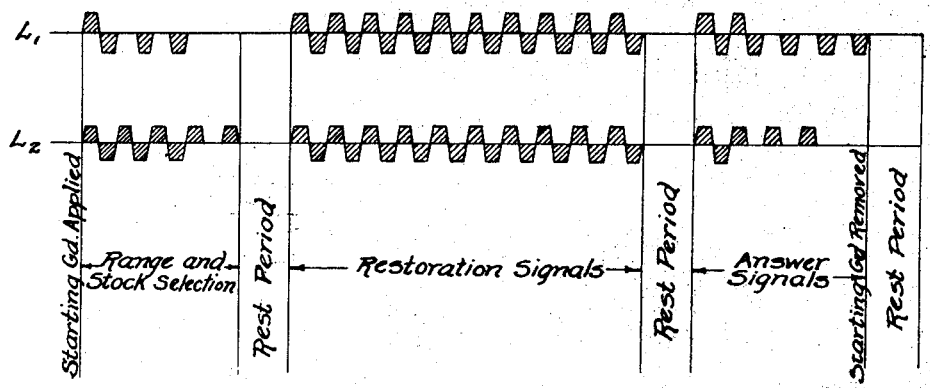
Figure 2 is a current-time diagram showing the groups of current variations transmitted over the four channels by the apparatus of Figure 1.

Referring first to Figure 2, in which I have shown the nature and arrangement of the impulses transmitted by the apparatus in Figure 1, it will be noted that the signals are composed of three main groups, namely the range and stock selecting group, the restoration group and the answer group. Each group is followed by a rest period to permit certain transfer operations to take place at the receiving apparatus, following the receipt of each group of signals. The signal groups may be transmitted over two lines $L_1$ and $L_2$, each line constituting two channels of communication. The positive impulses transmitted over each line form one channel of communication and the negative impulses constitute another channel.

These signals transmitted over any one channel comprise impulses of definite polarity and period separated by a no impulse period of equal or greater length. The negative impulses forming one channel are interspaced, as far as possible, with the positive impulses forming another channel and both sets of signals are transmitted over the same line.

Provision is made for the transmission of a maximum of ten impulses for each channel, for each of the signal groups. The number of impulses transmitted for each selecting and answer group however, depends, in each instance, upon the range and stock selected and upon the numerical value of the quotation. In the case of the range and stock selection the impulses would ordinarily be considerably less than ten, since as before stated the stocks having the greatest volume of sales are designated by numbers having digits of a low order.

In the example illustrated in Figure 2, the signals which would be transmitted for selecting the "last" quotation of a stock arbitrarily designated by the number 353, would comprise one positive impulse over line $L_1$, corresponding to the numerical designation of the "last" quotation and three negative impulses over line $L_1$, five positive impulses over line $L_2$ and three negative impulses over line $L_2$, corresponding respectively to the hundreds, tens and units digits of the stock designating number. The transmissions of this selecting group requires a maximum of five impulses over any one channel, corresponding to the largest digit number, 5. The restoration group is always composed of ten impulses for each channel and is transmitted immediately following the rest period, which immediately follows the transmission of the last selecting signal.

The answer signals comprise two positive impulses and five negative impulses over line $L_1$ and four positive impulses and one negative impulse over line $L_2$, such impulses corresponding to the hundreds, tens, units and fractions digits of the quotation or answer.

The last rest period follows immediately after the transmission of the last answer signal.

In Figure 1 I have shown a system for transmitting the type of signals illustrated in Figure 2. The system comprises four rotary distributors $D_1$, $D_2$, $D_3$ and $D_4$ (shown developed), each distributor having two sets of contacts rings numbered 101 to 116, respectively. Distributor $D_1$ serves to transmit the selecting signals for the range and hundreds digit of the stock designating number. Distributor $D_3$ controls the transmission of the tens and units digits of the arbitrary stock designating number. Distributor $D_2$ controls the transmission of the restoration and answer signals for the hundreds and tens digits of the quotation and distributor $D_4$ controls the transmission of the restoration and answer signals of the units and fractions digits of the quotation.

Rings 101 and 102 are bridged by a brush $b_1$, rings 103 and 104 by a brush $b_2$, rings 105 and 106 by a brush $b_3$, rings 107 and 108 by a brush $b_4$, rings 109 and 110 by a brush $b_5$, rings 111 and 112 by a brush $b_6$, rings 113 and 114 by a brush $b_7$ and rings 115 and 116 by a brush $b_8$. The brushes of each distributor move in unison across the surface of the rings as is well understood in rotary distributor operation and are normally held on their first segments by locking latches. Brushes $b_1$ and $b_2$ are held by a latch 117 pivoted to 118 and brushes $b_3$ and $b_4$ are held by a latch 119 pivoted to 120.

Distributors $D_1$ and $D_2$ are identical with distributors $D_3$ and $D_4$ and, therefore, only the former pair will be described in detail.

Ring 101 is provided with a group of twenty transmitting segments numbered 1 to 20 and ring 105 is provided with two groups of twenty transmitting segments, numbered 21 to 40 and 41 to 60, respectively. Insulating segments 61 and 62 precede each of the groups of ring 105. Ring 102 has an initial segment 63 and a solid segment 64, the latter being coextensive with segments 1 to 20 and being connected to the line $L_1$. Ring 101 is also provided with an initial segment 65 opposite segment 63. The brush $b_1$ normally rests on segments 63 and 65.

Rings 103 and 104 each have a series of eighteen control segments numbered 1' to 18' disposed opposite each other and opposite segments 2 to 19 of ring 101. Ring 106 of distributor $D_2$ has a solid contact 66 disposed opposite contacts 21 to 60 and connected to the line $L_1$. Rings 107 and 108 have insulating segments 67 and 68 disposed opposite segments 21 to 40 and a series of eighteen control segments 41' to 58' disposed opposite segments 42 to 59 of ring 105.

The odd numbered transmitting segments 1 to 19 are strapped together and connected to the switch tongue 121 of a relay 122 and through the back contact 123 thereof to battery of positive polarity at 124. Likewise the even numbered transmitting segments 2 to 20 are connected together and to the switch tongue 125 to a relay 126 and through the back contact 127 thereof, to battery of negative polarity at 128.

The odd numbered central segments 1' to 17' of ring 104 are connected to a group of wires A, which terminate at a selecting grounding device whereby a ground may be applied to any desired one of such wires. The even numbered central segments 2' to 18' are similarly connected to a group of wires B for applying a ground connection to any one of such segments. The odd numbered control segments 1' to 17' of ring 103 are connected together and to one end of the winding of relay 122, the opposite end of which is connected to a battery 129 and thence to the ground, and the even numbered control segments 2' to 18' of ring 103 are similarly connected to the windings of relay 126.

The first segment 63 of ring 102 is connected to the winding of a starting magnet SM and thence through the winding of a similar starting magnet associated with distributor $D_3$ to a battery 130 and to the ground. The circuit of the starting magnet SM is continued through contact segment 65 to the back contact of switch tongue 131 of relay 126 and conductor 132 to the front contact and switch tongue 133 of a relay 134 and thence to the starting ground SG. The front contact of switch tongue 131 is connected to the front contact of a similar switch tongue 134 of relay 122, which in turn is connected to a conductor 135 joined in series with the corresponding switch tongues 134' and 131' and front contacts of relays 122' and 126', associated with distributor $D_3$. This circuit is completed from switch tongue 131' through the starting magnets SM' of distributors $D_2$ and $D_4$ to a source of potential 136 and to the ground.

Relays 122, 126, 122' and 126' are provided with locking circuits through their contacts 137 and conductor 132 to the starting ground SG. It will be noted that the segments of the distributor $D_3$ are connected with the windings and contacts of relays 122' and 126' in the same manner as the segments of distributor $D_1$ are associated with the windings and contacts relays 122 and 126.

In an exactly similar manner the odd numbered transmitting segments 21 to 59 and the even numbered segments 22 to 60 are connected, respectively, to the contact tongues 140 and 141 of relays 142 and 143, for applying battery of positive polarity to the odd segments and negative polarity to the even segments of the restoration and answer groups. Odd numbered control segments 41' to 57' and even numbered control segments 42' to 58' of ring 107 are also connected respectively, to the windings of relays 142 and 143 and thence to the battery 144. The odd numbered control segments 41' to 57' of ring 108 are connected to a group of wires C for applying a ground to one of said segments through the ground selecting device and the even numbered control segment 42' to 58' of ring 108 are connected to a similar group of wires D.

The contact tongue 145 of relay 142 is grounded at 146 and a circuit is completed from this ground through the front contacts of relays 142 and 143, contact tongue 147, conductor 148 to the corresponding switch tongues 145' and 147' of relays 142' and 143' and thence by conductor 149 to the winding of a key release magnet 150, in series with a relay 151 and to a battery 152 grounded at 153.

The relay 134 controls the application of the starting ground SG to the starting magnets SM and SM' and to the locking circuits for relays 122, 126, 122', 126', 142, 143, 142' and 143'. The circuit to relay 134 is completed by a key 154 having a grounded contact 155. A locking circuit is provided for relay 134 through the front contact and switch tongue 156 of relay 134 and switch tongue 157 and back contact of relay 151 to the ground at 158.

The operation of the transmitting apparatus is as follows: The range and stock selecting signals and the answer or quotation signals are set up through a key-board or other arrangement which applies a ground connection to one wire of each of the groups A, B, C, D, A', B', C' and D'. In the example illustrated in Figure 2 for transmitting the "last" quotation of stock 353, having a quatation of 254⅛, the following segments of distributors $D_1$, $D_2$, $D_3$ and $D_4$ would be grounded: Segment 1' of distributor $D_1$, corresponding to the "last" range selection, segment 6' of distributor $D_1$ corresponding to the hundreds digit 3 of the stock selecting number, segment 9' and 6' respectively of distributor $D_3$ corresponding to the tens and units digits of the stock designating number, segments 43' and 50' of distributor $D_2$ representing the hundreds and tens digits of the quotation and segments 47' and 42' of distributor $D_4$ corresponding respectively to the units and fractional values of the quotation.

After the above ground connections have been completed the starting key 154 is depressed thereby operating relay 134, which upon picking up, completes its locking circuit through the back contact of relay 151 and completes a circuit to the starting magnet SM from the starting ground SG, contact tongue 133, conductor 132, switch tongue 131 of relay 126, segments 65 and 63 of distributor $D_1$ to the windings in series of the starting magnets SM of distributors $D_1$ and $D_3$ and to the battery 130. The brushes $b_1$, $b_2$, $b_5$ and $b_6$ are thus released and move across the segments of the distributors $D_1$ and $D_3$.

Referring to distributor $D_1$, as brush $b_1$ passes onto transmitting contact 1, a positive impulse is sent to the line from the positive battery connection 124, contact tongue 121, segment 1 and segment 64. As the brush moves off from segment 1, brush $b_2$ moves onto grounded control segment 1', thus completing a circuit from the ground through segments 1' to the winding of relay 122 and battery 129. Relay 122 then picks up, completes its locking circuit through contact tongue 137, and conductor 132 to the starting ground SG. At the same time the positive battery is removed from the odd numbered segments of ring 101 at contact tongue 121. Contact tongue 134 also moves to its front contact, thereby partially preparing a circuit for the starting magnets $SM_1$ of the distributors $D_2$ and $D_4$.

When brush $b_1$ moves onto transmitting segment 2 the negative battery 128 is applied to the line in the same manner through contact tongue 125. The subsequent movement of the brush $b_1$ across the odd numbered contacts does not transmit any impulses to the line but as it passes over each even contact a negative impulse is transmitted until the brush $b_2$ reaches a grounded segment 6' at which time relay 126 operates to remove the battery 128 from the even segments, at the same time completing its locking circuit and moving contact tongue 131 to its front contact to further prepare the circuit for starting magnets SM'.

In an exactly similar manner, signals are simultaneously transmitted over line $L_2$ through distributor $D_3$, brush $b_6$ as it passes over grounded control segments 6' and 9', operating the relays 126' and 122' to remove the battery connections from the transmitting segments and to close the contact tongues 131' and 134'. As soon as the last of the relays 122, 126, 122' and 126' has operated, a circuit is established from the starting ground SG through the switch tongues 131, and 134, conductor 135 and switch tongues 134' and 131' to the windings of starting magnets SM' and to the battery 136. The brushes of distributors $D_2$ and $D_4$ are thus released immediately after the transmission of the last selecting signal to start the transmission of the restoration and answer signals.

The passage of the brushes $b_3$ and $b_7$ over the transmitting segments 21 to 40, forming the restoration group transmit a series of ten positive and ten negative impulses over each of the lines $L_1$ and $L_2$, to restore the hundreds, tens, units and fractions indicators of the stock selected, to blank.

Upon engagement of the brushes with transmitting segments 41 to 60, forming the answer group, another series of positive and negative impulses are transmitted over each of the lines until such time as the brushes $b_4$ and $b_8$ engage the control segments, grounded through the groups of wires C, D, C' and D'. The engagement of the brushes $b_4$ and $b_8$ with such grounded segments causes the operation of relays 142, 143, 142' and 143' to remove the battery connections in succession from the transmitting segments and to complete the circuit from the ground 146 through the contacts of these relays to the latch releasing magnet 150 and relay 151, this circuit being completed at the time the last answer signal is transmitted.

The operation of the latch releasing magnet 150 permits each of the keys of the key-board to return to its normal ungrounded position and the operation of relay 151 breaks the holding circuit for relay 134, which in turn breaks the starting ground connection, at contact 133. This in turn causes the release of all of the control relays whereby they are restored to normal and the system is in readiness for the transmission of the next signal group.

Figure 3:
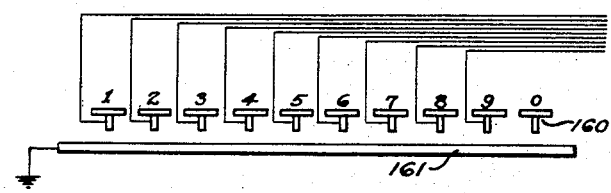
Figure 3 illustrates a possible arrangement of the signal selecting keys for one group of signals transmitted over one channel.
Figure 4:
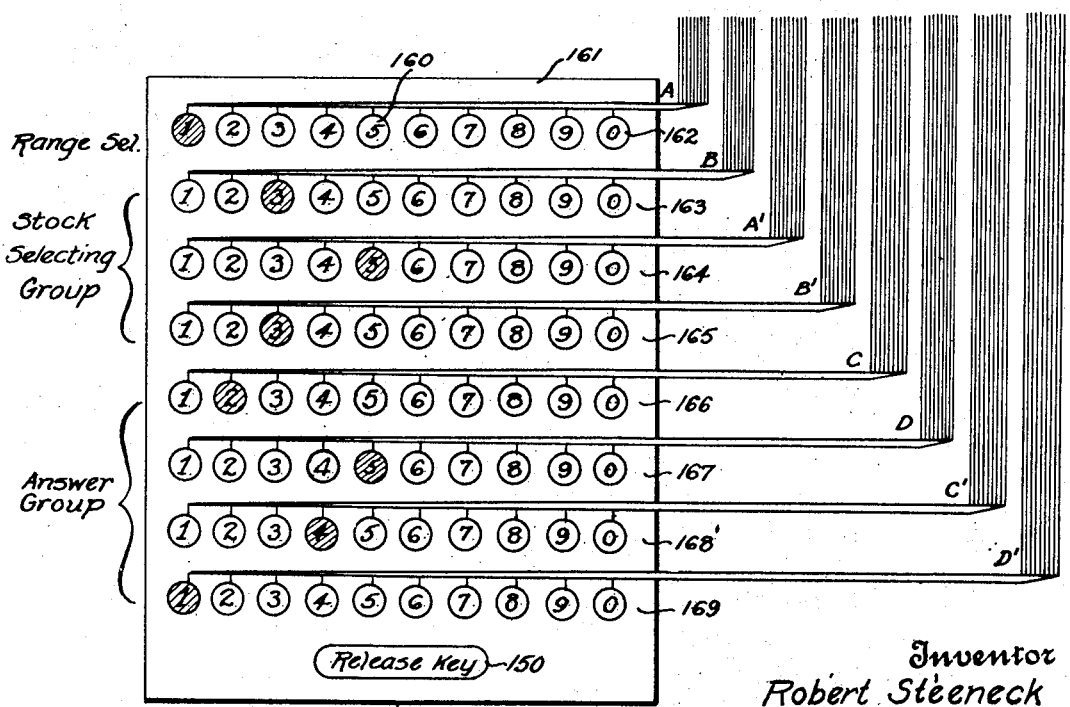
Figure 4 illustrates a possible arrangement of the entire signal selecting key-board.

In Figures 3 and 4 I have shown one means by which the selective ground may be applied to the wires of groups A, B, C, D, A', B', C' and D'. The wires of each of these groups are connected to one key of a row of ten keys 160, placed above a grounded plate 161. Eight of such rows of keys are provided, numbered 162 to 169. Row 162 controls the range selection, rows 163, 164 and 165 control the hundreds, tens and units digits of the stock selecting number, and rows 166, 167, 168 and 169 control the hundreds, tens, units and fractional values of the quotation. A release key 150 is also provided. Each row of keys is provided with a locking latch bar 170 (see Figure 1) which holds the key in its lowered position after it has been depressed. A separate magnet may be provided for each row of keys, in series with release magnet 150, for releasing the latch bars thereof.

When it is desired to transmit a particular quotation such as the "last" quotation of stock 353 quoted at 254⅛, each of the shaded keys shown in Figure 4 is depressed to set up the grounded circuits through the segments of rings 104, 108, 112 and 116, after which the release key 150 is depressed to complete the circuit to the starting magnets SM of distributor $D_1$ and $D_3$. The transmission of the signals then automatically proceeds.

It will be apparent that many changes and modifications may be made in the construction and arrangement of the parts herein described without departing from the invention and therefore, I do not desire to be limited to the exact details illustrated and described but include within the purview of the invention, all such modifications and changes as come within the scope of the appended claims.

What I claim is:

1. Apparatus for the transmission of impulses to control the operation of quotation indicators comprising a plurality of rotary transmitters having segments thereon corresponding to a plurality of groups of signals to be transmitted and cooperating brushes for transmitting said groups of signals, means for applying a source of potential to said segments, means including other segments for controlling the application of said source of potential to said first segments in accordance with a prearranged code and means for controlling said brushes to start the transmission of the signals of each group at a predetermined time after the completion of the transmission of the signals of the preceding group.

2. Apparatus for the transmission of impulses to control the operation of quotation indicators comprising a first and a second transmitter, a start-stop device for each of said transmitters, means for transmitting variable numbers of signals over said first transmitter and means acting upon the transmission of the last signal from said first transmitter and in an intermediate portion thereof for releasing the start-stop device of the second transmitter.

3. Apparatus for the transmission of electrical impulses comprising a first transmitter and a second transmitter, a start-stop device for each of said transmitters, means for transmitting varying numbers of selecting signals over said first transmitter, means acting upon the transmission of the last signal from said first transmitter for transmitting a release impulse to release the start-stop device of the second transmitter to start the operation thereof, means for preventing the start-stop device of said first transmitter from operating during the transmission of signals by said second transmitter and means acting upon the transmission of the last signal by said second transmitter to permit the start-stop device of said first transmitter to again function in response to subsequent release impulse.

4. Apparatus for the transmission of electrical impulses comprising a first transmitter and a second transmitter, transmitting segments and control segments on said transmitters, means for applying a source of potential to said transmitting segments, means for completing a circuit through predetermined of said control segments to determine the number of signal impulses transmitted by said transmitting segments and means in said circuit operating upon the transmission of the last impulse by said first transmitter for starting the operation of the second transmitter.

5. Apparatus for the transmission of electrical impulses comprising a first transmitter and a second transmitter, a plurality of sets of transmitting segments on each of said transmitters, for transmitting a corresponding number of sets of signal impulses by each transmitter, a plurality of sets of control contacts on said first transmitter, a starting magnet for said second transmitter, a circuit for said magnet, means for starting said first transmitter, means including said control contacts for completing a control circuit for each set of transmitting segments of said first transmitter to discontinue the transmission of signals thereby after a predetermined number of impulses of each set have been transmitted and means for partially preparing a circuit for said starting magnet upon the completion of each of said control circuits, said starting magnet circuit being completed upon the completion of the last control circuit.

6. Apparatus for the transmission of electrical impulses comprising a first transmitter and a second transmitter, a plurality of sets of transmitting segments on each of said transmitters for transmitting a corresponding number of sets of signal impulses by each transmitter, a starting magnet for said second transmitter, a circuit for said magnet, means for starting said first transmitter, means including said control contacts for completing a control circuit for each set of segments of said first transmitter to discontinue the transmission therefrom after a predetermined number of impulses of each set have been transmitted and a relay in each of said control circuits for partially preparing a circuit for said starting magnet upon the completion of each of said control circuits, said starting magnet circuit being completed upon the completion of the last control circuit.

7. Apparatus for the transmission of electrical impulses comprising a first transmitter and a second transmitter, a plurality of sets of transmitting segments on each of said transmitters for transmitting a corresponding number of sets of signal impulses by each transmitter, a starting magnet for said second transmitter, a circuit for said magnet, means for starting said first transmitter, means including said control contacts for completing a control circuit for each set of segments of said first transmitter to discontinue the transmission therefrom after a predetermined number of impulses of each set have been transmitted, a relay in each of said control circuits for partially preparing a circuit for the starting magnet upon the completion of each of said control circuits, said starting magnet circuit being completed upon the completion of the last control circuit, and means for restoring said transmitters to normal after the transmission of the last indicator operating signal.

8. Apparatus for the transmission of electrical impules comprising a plurality of transmitters, a plurality of transmitting segments on each of said transmitters, means for applying potential of opposite polarity to the alternate segments of each transmitter to provide two control channels of communication, a plurality of control segments on each distributor, means for preparing control circuits for each of said channels through predetermined of said control segments, said control circuits being completed upon the operation of the distributor to control the number of impulses transmitted over each channel by each of said distributors and means for preventing the operation of one of said transmitters during the transmission of signals by the other.

9. Apparatus for the transmission of electrical impulses comprising a first and second transmitter, a plurality of transmitting segments on each of said transmitters, means for applying potential of opposite polarity to the alternate segments of each transmitter to provide two control channels of communication, a plurality of control segments on each distributor, means for preparing control circuits for each of said channels through predetermined of said control segments, said control circuits being completed upon the operation of the distributor to control the number of impulses transmitted over each channel by each of said distributors, means for preventing the operation of one of said transmitters during the transmission of signals by the other, and means for rendering said first of said transmitters operative immediately upon the completion of the operation of second transmitter.

10. The combination of a plurality of rotary distributors, a brush for each distributor, a plurality of transmitting segments and a plurality of control segments on each distributor, means for operating said distributors in succession and means controlled by said control segments for starting the operation of one distributor after the brush of the preceding distributor has passed over a predetermined variable number of segments.

11. The combination of a plurality of rotary distributors, a brush for each distributor, a start-stop device for each distributor, a magnet for operating each of said start-stop devices, a plurality of transmitting segments and a plurality of control segments on each of said distributors, and means for causing said distributors to operate in succession said means comprising a circuit completed through selected control segments of one distributor after its brush has passed over predetermined of its transmitting segments, said circuit including and serving to operate the magnet of said start-stop device of the succeeding distributor.

ROBERT STEENECK.